United States Patent [19]

Beringhause et al.

[11] Patent Number: 5,121,180
[45] Date of Patent: Jun. 9, 1992

[54] ACCELEROMETER WITH CENTRAL MASS IN SUPPORT

[75] Inventors: Steven Beringhause, North Attleboro, Mass.; Raymond E. Mandeville, Cumberland, R.I.; W. Donald Rolph, III, East Walpole, Mass.

[73] Assignee: Texas Instruments Incorporated, Dallas, Tex.

[21] Appl. No.: 718,523

[22] Filed: Jun. 21, 1991

[51] Int. Cl.$^5$ .............................................. H01L 29/84
[52] U.S. Cl. ....................................... 357/26; 357/25; 357/55; 357/51; 73/777; 73/517 R; 73/768; 73/517 AV; 73/517 A; 73/517 B
[58] Field of Search ........................ 357/25, 26, 55, 51; 73/517 R, 517 AV, 516 R, 718, 517 B, 760, 768, 777, 517 A

[56] References Cited

U.S. PATENT DOCUMENTS

| | | | |
|---|---|---|---|
| 2,963,911 | 12/1960 | Courtney-Pratt et al. | 73/517 |
| 3,709,042 | 1/1973 | Lee et al. | 73/516 R |
| 4,332,000 | 5/1982 | Petersen | 357/26 X |
| 4,488,445 | 12/1984 | Aske | 73/517 R |
| 4,553,436 | 11/1985 | Hansson | 73/517 R |
| 4,641,539 | 2/1987 | Vilimek | 73/862 |
| 4,656,750 | 4/1987 | Pitt et al. | 33/352 |
| 4,670,092 | 6/1987 | Motamedi | 357/26 X |
| 4,809,552 | 3/1989 | Johnson | 73/517 R |
| 4,825,335 | 4/1989 | Wilner | 361/283 |
| 4,893,509 | 6/1990 | MacIver et al. | 73/517 AV |
| 5,016,072 | 5/1991 | Greiff | 357/26 |

FOREIGN PATENT DOCUMENTS

| | | | |
|---|---|---|---|
| 62-213176 | 9/1987 | Japan | 357/26 |
| 0249472 | 2/1990 | Japan | 357/26 |
| 8505737 | 12/1985 | PCT Int'l Appl. | 357/26 |

OTHER PUBLICATIONS

"Technical Note TN-008", Silicon Accelerometers, 1988, IC Sensors, Milpitas, Calif.
"Accelerometer Systems with Self-Testable Features", H. V. Allen, S. C. Terry, D. W. DeBruin, Sensors and Actuators, 20 (1989) 153-61.

Primary Examiner—William Mintel
Attorney, Agent, or Firm—Russell E. Baumann; Rene E. Grossmann; Richard L. Donaldson

[57] ABSTRACT

An accelerometer is shown with improved drop resistance for regulating automotive safety air-bag systems and the like. The device comprises a member of silicon semiconducting material having a central seismic mass mounted on a surrounding support by intervening beams, a pair of beams extending from each of four sides of the mass to the support and the mass being otherwise free of connection to the support to permit movement of the mass along an axis perpendicular to the plane of the support in highly sensitive response to acceleration forces along that axis. Each beam extends from a location near an end of one side of the mass so that the two beams extending from each side of the mass are widely spaced relative to each other to oppose rotational or twisting movement of the mass in response to off-axis acceleration forces to prevent damage to the beams during dropping of the accelerometer to the extent possible consistent with providing the desired sensitivity of response. Piezoresistive sensors are accommodated in selected beams to sense strain during movement of the mass to provide an output signal corresponding to acceleration force along the device axis. Stops limit movement of the mass along that axis to further avoid damage to the beams.

9 Claims, 3 Drawing Sheets

ACCELEROMETER WITH CENTRAL MASS IN SUPPORT

BACKGROUND OF THE INVENTION

The field of the invention is that of accelerometers and the invention relates more particularly to silicon micromachined accelerometers for regulating automotive safety air-bag systems.

Silicon micromachined accelerometers are known which comprise a member of silicon semiconducting material having a central mass mounted on an integral support by beams which extend between the mass and support to permit movement of the mass in response to acceleration force. Such known accelerometers have displayed less than desired sensitivity of response to acceleration force along a particular axis or have provided desired sensitivity only with a loss of some precision of response due to effects of off-axis acceleration forces or with significant loss of durability when subjected to dropping and the like during manufacture, shipping, storage, installation and use.

In one known accelerometer, a micromachined member of silicon semiconducting material has two beams extending from each of two opposite sides of a mass connected to an integral support to permit movement of the mass in response to acceleration force. Piezoresistive strain sensors accommodated in the beams provide an electrical output corresponding to acceleration of the device along an axis perpendicular to the plane of the mass and support. In that device, however, the mass tends to undergo substantial rotational movement due to off-axis acceleration forces so that the sensors in the different beams tend to indicate different degrees of mass movement. As a result, compensation in the device circuit must be relied upon to a significant extent to counteract the effects of that substantial rotational movement in order to provide acceptable accuracy in the output signal from the device. Most important, etching used in micromachining the silicon member leaves somewhat sharp corners at junctions of the beams with the mass and the support. When such beams are proportioned to provide the device with highly sensitive movement or acceleration response characteristics along one axis, the beams are very easily broken if they are subjected to significant off-axis acceleration forces such as will occur if the device is dropped during manufacture, shipping or installation or the like. That is, while the silicon material has substantial strength and has excellent spring characteristics for permitting highly responsive movement of the mass along the desired sensing axis, the silicon beam materials which are somewhat brittle are found to be easily broken by stress concentration at the noted sharp corners as a result of bending stresses due to the off-axis acceleration forces which are applied in the plane of the mass and support, transverse to the lengths of the two bars of beams, if the accelerometer is dropped.

In another known accelerometer as shown in U.S. Pat. No. 4,553,436, a folded leaf-spring portion of a micromachined silicon member extends between each of four sides of a central mass and a surrounding support but again the mass is subject to substantial rotational movement due to off-axis forces and the structure has poor resistance to damage during dropping. Another known accelerometer shown in U.S. Pat. No. 2,963,911 has a single straight beam extending from the center of each of four sides of a central mass to a surrounding support. In that arrangement the mass is subject to substantial rotational movement around an axis extending along the length of any beam or opposing pair of beams in response to off-axis acceleration forces. In another known accelerometer shown in U.S. Pat. No. 4,809,552, a single beam extending away from a mass divides into two legs where the beam connects to opposite sides of an integral support. That arrangement is subject to breakage of the legs if dropped due to off-axis acceleration forces in the direction along the length of the beam through the mass. In another accelerometer as shown in U.S. Pat. No. 4,825,335, more than ten beams extend between each of two opposite sides of a mass and a surrounding support and more than twenty beams extend between each of two other opposing sides of the mass and the support. Capacitive sensor means are arranged to detect movement of the mass. In that known structure, the multiplicity of beams tends to unduly restrict sensitivity of device response along the intended acceleration sensing axis of the device relative to the extent to which the beams oppose rotational movement of the mass. That is, the beams located near the central parts of the mass contribute little or nothing to oppose rotational movement of the mass.

Related subject matter is shown in commonly assigned copending application, Ser. No. 07/631,563 filed Dec. 21, 1990.

BRIEF SUMMARY OF THE INVENTION

It is an object of the invention to provide a novel and improved accelerometer; to provide such an accelerometer which is reliable and durable during manufacture, shipping, handling and use and which achieves such durability with desired sensitivity of response to acceleration force in a particular direction; to provide such an accelerometer which is particularly adapted with respect to cost, durability, accuracy and reliability for use in automotive safety air-bag applications; to provide such an automotive safety accelerometer which is sufficiently durable to withstand damage if dropped during manufacture, shipment, storage and assembly and the like; to provide such an accelerometer which displays improved performance characteristics; and to provide such an improved accelerometer having a low cost, easily manufactured structure.

Briefly described, the novel and improved accelerometer of the invention comprises a main or principal member of a silicon semiconducting material having a central mass, having a support disposed in a plane around the central mass, having two, spaced-apart portions of each of four rectilinearly disposed sides of the mass connected to the support by integral beams extending between the mass and the support, and having all of the other portions of the mass spaced from the support and free of connection to the support. The beams are proportioned to mount the mass resiliently on the support for movement along a first axis perpendicular to the plane of the support and mass with a selected sensitivity of response to acceleration forces applied to the mass along that axis. Preferably the beams are connected to portions of the mass at respective ends of the rectilinearly disposed sides of the mass and extend to closely adjacent portions of the support so that the beams cooperate to oppose and substantially prevent rotational movement of the central mass in response to the off-axis acceleration forces which may be applied to the mass during use. Preferably the beams have tapered sections to enhance movement of the mass along the desired axis in response to acceleration force. Preferably for example each beam has two tapered beam sections having relatively wider parts at respective ends of the beams and having relatively narrower parts nearer the center of the beam. The taper of each beam section is selected to provide substantially uniform strain in each tapered beam section in response to movement of the mass along the noted first axis. The silicon materials of selected beams are doped in a well known manner to form piezoresistive sensors in the beams to be responsive to strain in the beams during movement of the mass. Preferably piezoresistive sensors are accommodated in the beam materials within the respective tapered, uniform-strain beam sections in two pairs of beams extending from two opposite sides of the mass to be responsive to that uniform strain. The piezoresistive sensors are then interconnected in a bridge circuit in a previously known manner to compensate for any possible rotational movement of the mass and are connected in an electronic signal conditioning circuit to provide an electrical output signal corresponding to the movement of the mass which occurs in response to acceleration forces applied along the noted first or test axis of the accelerometer.

In the preferred embodiment of the invention, the accelerometer further includes a base of a strong, rigid material such as glass or silicon and includes a cover of corresponding material. The base and cover are secured to opposite bottom and top sides respectively, of the support portion of the main member in selected spaced relation to the mass portion of the member to serve as stops to prevent excessive movement of the mass in response to excessive on-axis acceleration forces.

In that way, the mass portion of the main accelerometer member is supported on the support portion of the member to display a selected, highly sensitive response to acceleration forces applied along a first axis perpendicular to the plane of the support and mass, and the piezoresistive sensors are responsive to movement along that axis to provide an output signal corresponding to that movement and therefore to the acceleration force. The stops prevent damage to the beams from excessive acceleration forces along that first axis. However, if the accelerometer is dropped during manufacturing, shipment or use so that the mass is subjected to acceleration force along second or third axes which are perpendicular to the first axis and to each other, one of the pairs of the beams is disposed to be in tension and substantially free of bending stresses to oppose movement of the mass in response to those off-axis forces thereby to avoid damage to all of the beams. Further, the pair of beams extending from two widely spaced portions of each side of the mass cooperates with the rigidity of the mass itself to oppose twisting or rotational movement of the mass relative to the plane of the support. As a result, the beams are shielded from damage such as might result from twisting of the beam materials and, because little or no twisting or rotational movement of the mass is permitted by the beams, the interconnection of the sensors to compensate for rotational movement of the mass need be relied on only to a minor extent to compensate for such movement. Where the sensors are accommodated in only four of the beams as described, the sensors are easily and conveniently connected in the desired signal-conditioning and compensating circuit and permit convenient accommodation of additional known test circuit features and the like in the accelerometer.

BRIEF DESCRIPTION OF THE DRAWINGS

Other objects, advantages and details of the novel and improved accelerometer of the invention appear in the following detailed description of preferred embodiments of the invention, the detailed description referring to the drawings.

DESCRIPTION OF PREFERRED EMBODIMENTS OF THE INVENTION

Figure 1:
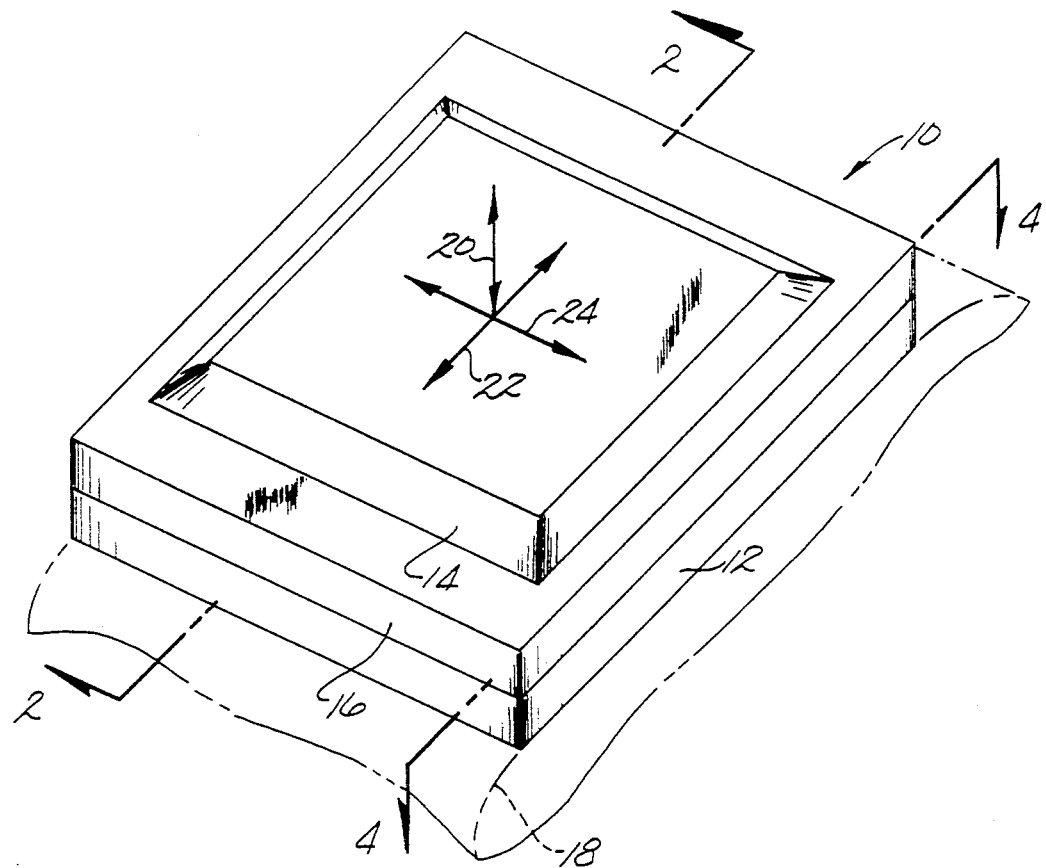
FIG. 1 is a perspective view of the novel and improved accelerometer of the invention.
Figure 2:
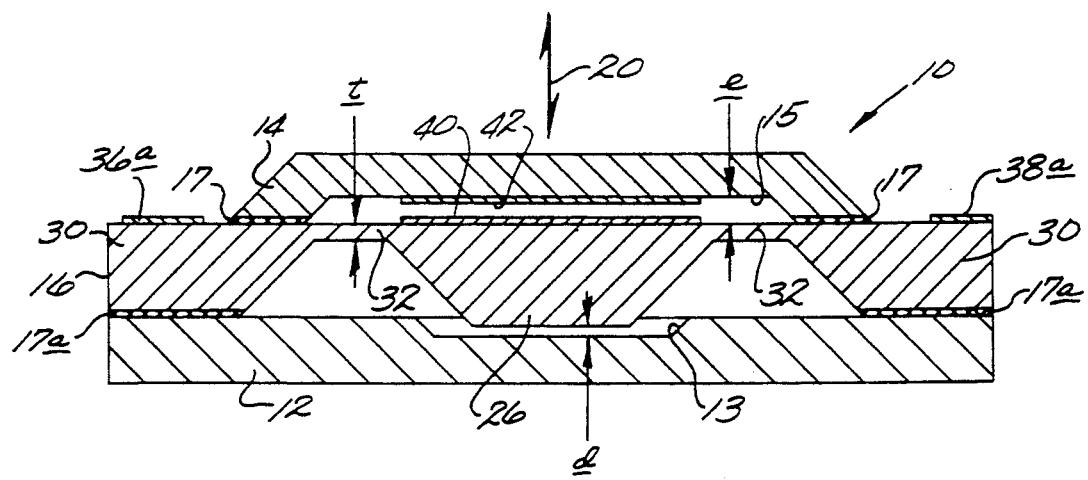
FIG. 2 is a section view to enlarged scale along line 2—2 of FIG. 1.
Figure 4:
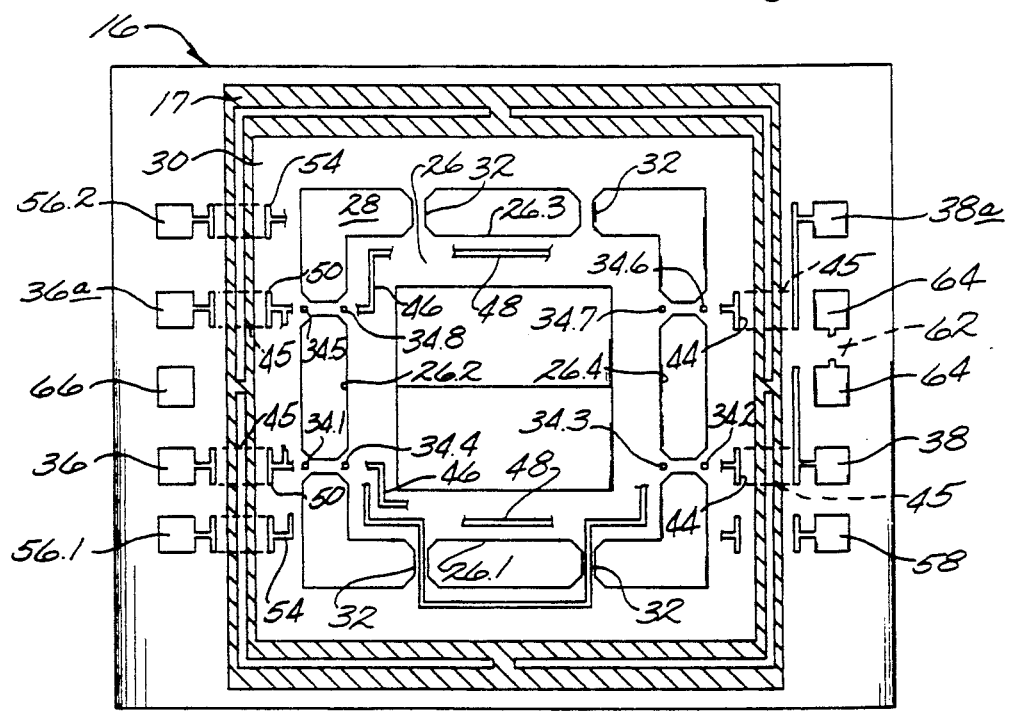
FIG. 4 is a section view to enlarged scale along line 4—4 of FIG. 1.

Referring to the drawings, 10 in FIGS. 1-2 indicates the novel and improved accelerometer device of the invention which is shown to include a base 12 of a strong, rigid material such as glass or silicon or the like, a cover 14 preferably of a similar material, and a main member 16 of a silicon semiconducting material or the like. The base and cover are secured in any conventional manner by metal alloy sealing means or the like 17a, 17 to the bottom and top respectively of the device as seen in FIGS. 2 and 4. A recess 13 in the base has its bottom spaced a selected distance d from the central portion of member 16. A corresponding recess 15 provided in the cover has its bottom with a selected spacing e from an opposite side of the member 16.

The accelerometer 10 is adapted to be mounted in an automotive safety air-bag system or the like diagrammatically indicated at 18 in FIG. 1 for regulating operation of the system in a conventional manner. In that regard, the accelerometer is adapted to sense acceleration force applied to the device along a first axis 20 and to provide an electrical output signal corresponding to the acceleration force along that axis. The device is also adapted to display reliability and durability and particularly to provide resistance to shock damage and the like when subjected to off-axis acceleration forces such as might be applied along second and third axes 22 and 24 perpendicular to the first axis and to each other due to dropping of the device or the like during manufacture, shipping, installation or use in an air-bag system. It should be understood that the term acceleration force as used herein includes acceleration and deceleration in both directions along the noted axes.

As silicon accelerometers are well known as shown in U.S. Pat. No. 4,553,436 for example, the disclosure of which is incorporated herein by this reference, the general structure of the accelerometer 10 is not further described and it will be understood that the semiconducting member 16 is formed of a silicon semiconductor material of one conductivity type and has a seismic central mass portion 26 mounted on a support 30 by beams 32 so that the mass is adapted to move along the axis 20 in response to acceleration forces along that axis. Piezoresistive sensors 34.1-34.8 (see FIGS. 3-5) are formed of a semiconductor material of a second conductivity type in situ within the member, and circuit path conductors formed in conventional manner interconnect the piezoresistive sensors to permit lead-in of electrical power from terminal pads 36 to the sensors and lead out of an output signal from the sensors via terminals 38. Stop means such as portions of the base 12 and cover 14 or the like are spaced from the semiconducting member 16 to limit movement of the mass 26 along the axis 20 when the device is exposed to excessive acceleration forces along axis 20. Preferably the stop means are located close to the mass 26 and air is captured between the base and cover and the member 16 to provide conventional squeeze-film damping of movement of the mass 26 in response to shock and vibration etc. If desired, capacitor plates 40, 42 are provided by metallizations on respective facing surfaces of the central mass 26 and cover 14 in selected spaced relation to each other to be electrically energized to electrostatically drive selected movement of the mass in conventional manner for test purposes and the like. Typically the piezoresistive sensors are interconnected in a selected bridge circuit or the like to provide an electrical output signal corresponding to acceleration force applied to the mass along axis 20. Preferably the sensors are interconnected to provide some reduction in the response of the device to off-axis acceleration forces by compensating within the circuit to some extent at least for rotational movement of the mass in response to off-axis forces which tend to result in above-average strain and below-average strain in individual device beams.

Figure 3:
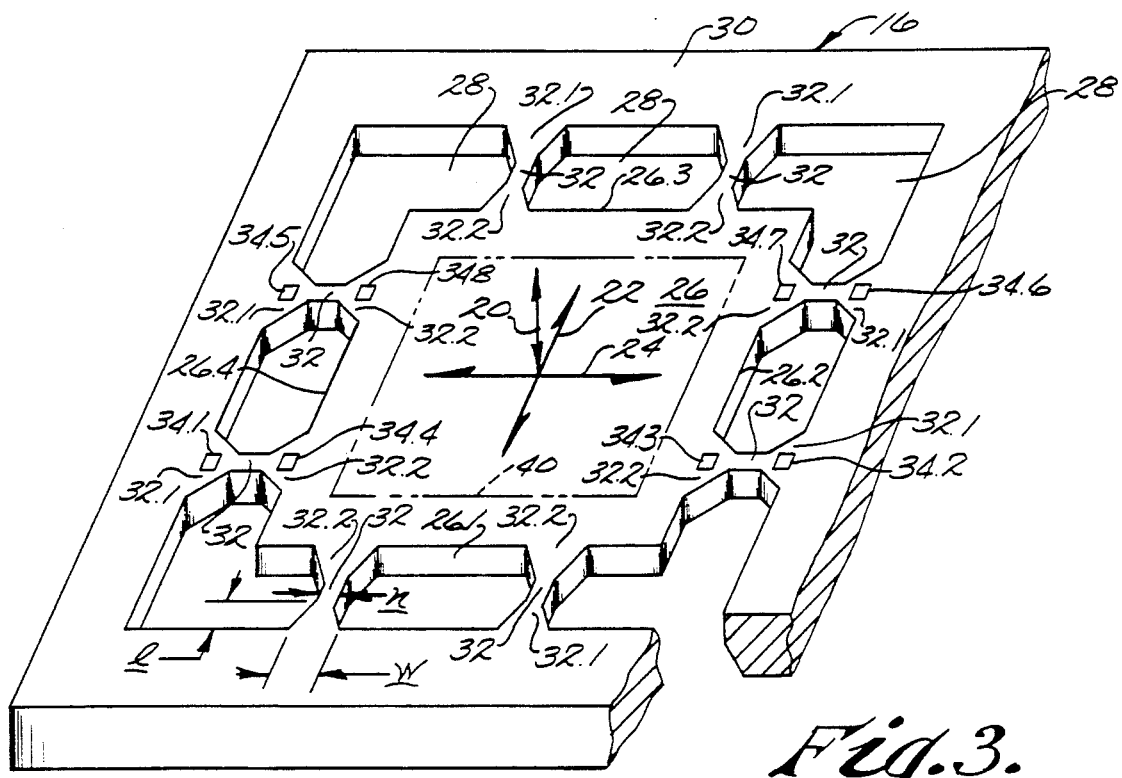
FIG. 3 is a perspective view to enlarged scale of the principal member of the accelerometer of FIG. 1.

In accordance with the invention, the main member 16 is preferably formed by conventional silicon micromachining techniques or the like to comprise a central seismic mass 26 mounted within an opening 28 on an integral support portion 30 of the member by two integral member beams 32 as shown in FIGS. 2-3 which are disposed in widely spaced relation to each other to extend between each of four sides of the central mass and the support, the sides of the mass being otherwise spaced from and free of connection to the support 30. The beams are proportioned to provide resilient mounting of the mass 26 so that the mass is permitted to move along the first axis 20 in a first direction perpendicular to the plane of the support and mass by bending of the beams in response to acceleration forces applied to the mass in that direction but the stop means 12 and 14 limit that movement to prevent beam damage. However, the beams themselves oppose and substantially limit movement of the mass along either of the second and third axes in response to acceleration forces which may be applied to the mass off the first axis 20. Each pair of beams and the associated side of the mass also cooperate like the flanges and web of an I-beam to oppose any tendency of the mass 26 to move with a twisting or rotational movement in response to such off-axis forces.

The member 16 is primarily formed of a silicon semiconducting material or the like of one conductivity type and portions 34.1-34.8 of at least some of the beam materials are doped to provide silicon materials of a second conductivity type to form piezoresistive sensor means in the beams. Those sensor means are adapted to sense strain introduced into the beam materials during movement of the mass 26 as above described to provide an electrical output signal from the device corresponding to the movement of the mass in response to acceleration forces. Accordingly the described arrangement of the beams 32, in opposing movement of the mass 26 in directions which would be off-axis with respect to the first axis 20, permits the sensor means 34.1-34.8 to provide an output signal more precisely corresponding to movement of the mass along axis 20 in response to acceleration force applied along that axis. That is, less compensation is required in the device circuit to counter off-axis movement where the beams substantially oppose or prevent such off-axis movement.

Most important, the described arrangement of the beams 32 assures that at least one pair of the beams 32 is oriented so that it is primarily placed in tension and is substantially free of bending stress in response to acceleration forces applied in either direction along either of the major off-axes 22 and 24. In that regard, the semiconducting material of silicon or the like embodied in the member 16 displays excellent elasticity and spring properties for permitting desired movement of the mass 26 along axis 20 in response to acceleration force and also displays excellent strength in tension. Accordingly, the described beam arrangement assures that the tensile strength of the member material in at least one of the pairs of beams is properly brought to bear substantially free of bending stresses in that pair of beams to oppose movement of the mass in response to the off-axis forces. For example, if an off-axis acceleration force tended to move the mass 26 to the right as viewed in FIG. 3 in response to acceleration force along the axis 22 due to dropping of the device or the like, the pair of beams 32 at the left of the mass as viewed in FIG. 3 are placed in tension to oppose such movement of the mass and are free of bending stress. In that way, that pair of beams shields two other pairs of beams (the pairs viewed at the top and bottom of FIG. 3) from damage due to such dropping forces. In that regard, such acceleration forces due to dropping, if applied to those latter two pairs of beams in the plane of the support 28 and transverse to the lengths of those two pairs of beams to result in bending stresses in those beams, would otherwise tend to easily shear those latter two pairs of beams from the mass or from the support at stress concentration point at the junctures of those beams with the mass or support. Of course, where off-axis acceleration forces are applied at an angle to the axes 22 and 24, more than one pair of the beams is placed at least partly in tension to cooperate in opposing off-axis movement of the mass and bending stress in the beams. Preferably the mass 26 is square and the beams 32 are equal in cross section with respect to each other and are disposed symmetrically around the mass.

Preferably for example, the beams 32 are provided with a selected configuration as shown in FIGS. 2-4. That is, the beams are provided with a thickness t substantially less than the thickness of the mass and support. Preferably each beam is provided with a tapered beam section 32.1-32.2 at each end of the beam where the beam is connected to the relatively thicker and stiffer mass and support portions of the member. The tapered beam sections are selected so that the strain in the beam material is substantially uniform throughout each tapered beam section during movement of the mass along axis 20. Preferably the beams 32 in each pair connected to a respective one of the four rectilinearly disposed sides 26.1-26.4 of the central mass are widely spaced relative to each other. Preferably for example, the beams of the pair are connected at one end to the mass near the ends of the particular side of the mass and connected at their opposite end to immediately adjacent portions of the support 30, thereby to provide the mass with greatest resistance to rotational movement due to off-axis forces consistent with providing the mass with the desired or selected sensitivity of response to acceleration forces along axis 20. That is, the beams are preferably connected to the mass as close to the ends of the mass sides as is conveniently permitted with symmetry using conventional silicon etching procedures. The piezoresistive sensor means 34.1-34.8 are preferably accommodated in the respective tapered sections of the two pairs of beams 32 located at opposite sides of the mass to be responsive to that uniform strain within each tapered beam section. As the function of such tapered beam sections is described in the commonly-assigned copending application noted above, the disclosure of which is incorporated herein by this reference, the tapered sections are not further described herein and it will be understood that wider portions w of the beams are selected so that the beam is subjected to sufficiently high strain during movement of the mass 26 on the axis 20 to permit the sensor means 34.1-34.8 to respond with an output signal of desired magnitude, and the length 1 and narrower portions n of the beam sections are selected to provide the desired uniform strain in the sections and so that the strain limits of the beam materials are not exceeded during response movement of the mass 26 to acceleration forces to be sensed along the axis 20. The beams are also proportioned so that the beams are strong enough to prevent damage to the beams as described above due to dropping forces likely to be encountered during manufacture, shipping, installation and use in an automotive environment.

Preferably as shown in FIG. 4, four of the piezoresistive sensors 34.1, 34.2, 34.6 and 34.5 hereinafter referred to as support sensors are disposed within respective tapered sections of two pairs of the beams at opposite sides 26.2, 26.4 of the central mass adjacent to the support 30. Each of the support sensors has a support end adjacent the support and has an inner end adjacent a central beam portion. Four other piezoresistive sensors 34.4, 34.3, 34.7 and 34.8 hereinafter referred to as mass sensors are disposed in tapered beam sections of the two pairs of beams at said opposite sides 26.2, 26.4 of the mass, each mass sensor having a mass end adjacent the mass and an inner end adjacent a central beam portion. A pair of conductor means 44 connect inner ends of respective pairs of sensors 34.6, 34.7 and 34.2, 34.3 to each other and via conventional tunnel connectors indicated at 45 to respective output terminals 38, 38a. Another pair of conductor means 46 connect mass ends of a pair of mass sensors 34.7, 34.3 adjacent one side 26.2 of the mass to mass ends of a corresponding pair of mass sensors 34.8, 34.4 at an opposite side 26.4 of the mass. An additional pair of conductor means 48 extends along respective sides 26.1, 26.3 of the mass to respectively connect support ends of the pair of sensors 34.6, 34.2 at said one end 26.4 of the mass to inner ends of the other pair of support sensors 34.5, 34.1 at the opposite side 26.2 of the mass. Respective conductor means 50 connect inner ends of the pair of mass sensors 34.8, 34.4 to support ends of the pair of support sensors 34.5, 34.1. The conductor means 50 are also respectively connected to input terminals 36, 36a via tunnel means 45 e.g. Preferably an additional conductor means 54 extends from check loop terminal 56.1 over the nearest beam 32 and then over the beams 32 disposed counterclockwise around the mass in sequence to the check loop terminal 56.2 adjacent to the last beam 32 in that sequence. Such a check loop is adapted to be used to assure continuity across the eight beams 32 provided in the accelerometer 10 during use as will be understood. If capacitor test plates 40, 42 are used, terminal pads 58, 36a are connected to the respective plates in any conventional manner. If desired, a test resistor means 62 corresponding to each of the sensors 34.1-34.8 is provided on the member 16 between terminal pads 64 and preferably when the member 16 comprises a silicon epitaxial layer deposited beneath an insulating oxide layer (not shown) a terminal pad 66 connects the silicon layer in the device circuit. With that arrangement, the noted conductor means are easily accommodated along the perimeter of the mass 26 and immediately around the inner rim of the support 30 to permit convenient accommodation of a capacitor plate 40 on the mass and to accommodate the noted terminals along outer edges of the member while providing any conventional metal alloy seal means 17 or the like to extend around the mass 26 for securing the base and cover in sealed relation to the member 16. Tunnel conductors are employed in conventional manner to pass any of the noted conductors under the metal alloy seal means or under crossover conductors as will be understood (see FIG. 5).

Figure 5:
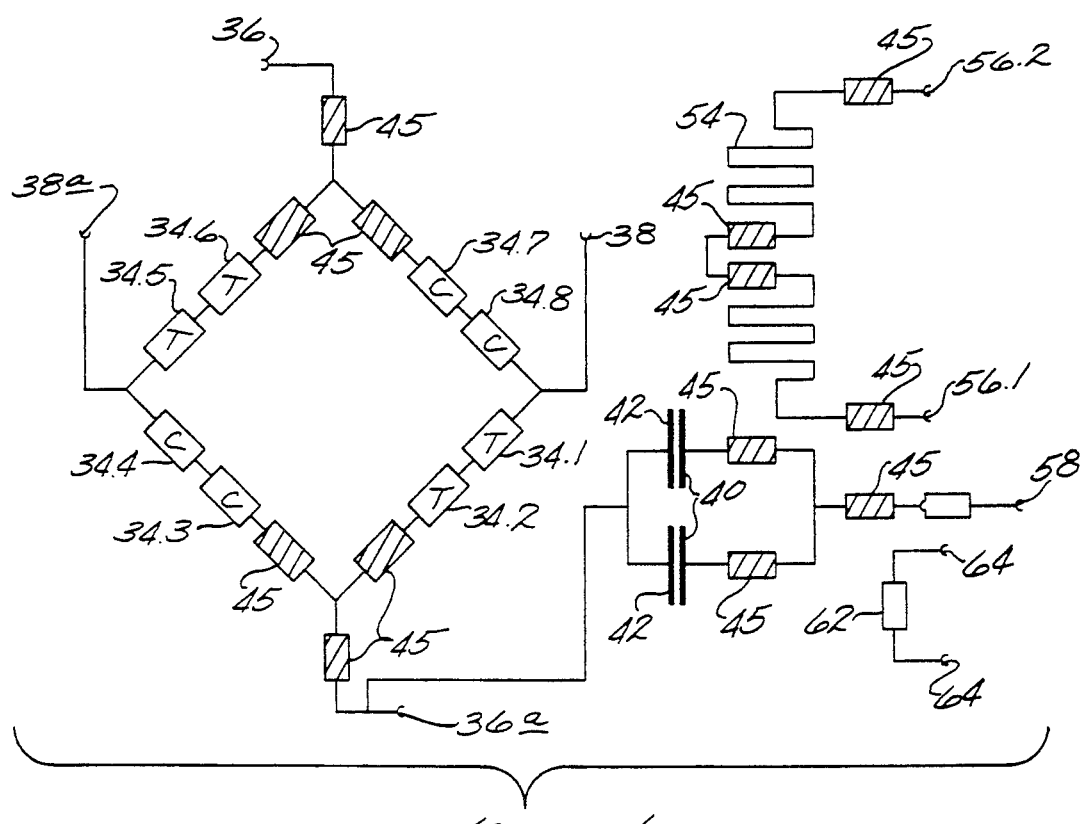
FIG. 5 is a schematic view illustrating interconnection of sensors and other components in the accelerometer of the invention.

Preferably for example, the sensors 34.1-34.8 are interconnected in a four leg bridge circuit as shown in FIG. 5. Where capacitor test plates 40, 42 are used, they are interconnected with the bridge circuit and with a microprocessor test circuit 43 as shown. Where the check loop and test resistors are used as above described, the circuit components are adapted to be interconnected as indicated in FIG. 5 using thirteen tunnel elements 45 as illustrated in FIG. 5. As will be understood, the sensors are proportioned to provide equal resistance when the mass 26 is at rest. Accordingly, application of an input voltage at the input terminals 36, 36a produces a near zero output voltage at the output terminals indicating the rest condition of the mass. When the mass moves along the axis 20, the mass sensors 34.4, 34.3, 34.7 and 34.8 on a top surface of the member are placed in compression to produce one change in resistance in second and fourth legs of the bridge while the support sensors 34.1, 34.2, 34.6 and 34.5 are placed in tension to produce an opposite change in resistance in the first and third bridge legs, thereby to provide an output voltage across the output terminals 38, 38a representative of the degree of acceleration, a greater acceleration producing a greater output voltage. When the mass 26 is subjected to off-axis acceleration forces, the eight beams cooperate to substantially oppose movement of the mass in off-axis directions and substantially oppose rotational movement of the mass. However, where the sensors are interconnected as shown in FIG. 5, any off-axis movement of the mass or tension/compression due to off-axis forces in the beams are adapted to be substantially compensated by corresponding changes in resistance as described in the commonly assigned copending application noted above. If the mass 26 is subjected to excessive acceleration force along the axis 20 such as might damage the beams 32, the mass is adapted to engage the base 12 or the cover 14 to limit mass movement and prevent beam damage. Accordingly, the accelerometer of the invention provides improved sensitivity and accuracy of performance in a highly durable structure particularly adapted for use in an automotive environment.

It should be understood that although particular embodiments of the invention have been described by way of illustrating the invention, the invention includes all modifications and equivalents of the disclosed embodiments falling within the scope of the appended claims.

We claim:

1. An accelerometer comprising:

a member of silicon semiconducting material having a central mass having a support disposed in a plane around the mass, having two spaced-apart portions of each of four rectilinearly disposed sides of the mass connected to the support by intervening beams, and having all other portions of the mass spaced from the support to resiliently mount the mass on the support for movement along an axis perpendicular to the plane of the support in response to acceleration force in the direction of the axis while opposing rotational movement of the mass and movement of the mass along other axes in response to other acceleration forces; and piezoresistive sensor means responsive to strain in selected beams during movement of the mass to provide an electrical output signal corresponding to acceleration force moving the mass along the axis perpendicular to the plane of the support.

2. An accelerometer according to claim 1 wherein the two beams connecting each side of the mass to the support are spaced apart by substantially the full length of the side of the mass.

3. An accelerometer according to claim 1 wherein the beams have tapered sections intermediate ends of the beams to enhance movement of the mass in response to acceleration force along the axis perpendicular to the plane of the support.

4. An accelerometer comprising:

a member of silicon semiconducting material having a central mass, having an integral support disposed in a plane in surrounding relation to the mass, having two portions of each of four rectilinearly disposed sides of the mass connected to the support by integral beams, and having all other portions of the mass spaced from and free of connection to the support resiliently mounting the mass on the support for movement along a first axis perpendicular to the plane of the support in response to acceleration force along the first axis while opposing rotational movement of the mass and movement of the mass along second and third axes perpendicular to the first axis and to each other in response to acceleration forces along the second and third axes;

piezoresistive sensors accommodated in the material of selected beams to be responsive to strain in the beams during movement of the mass to provide an electrical output signal corresponding to the acceleration force along the first axis; and stops limiting movement of the mass along the first axis.

5. An accelerometer according to claim 4 wherein the beams are proportioned to cooperate in opposing movement of the mass along the second and third axes during dropping of the accelerometer to prevent damage to the beams and permit movement in response to acceleration force along the first axis with selected sensitivity of response to acceleration force along the first axis, the beams being spaced apart to connect portions of the mass at respective ends of the rectilinearly disposed sides of the mass to adjacent portions of the support to optimize opposition to rotational movement of the mass in response to acceleration forces while providing the selected sensitivity of response to acceleration along the first axis.

6. An accelerometer according to claim 5 wherein a pair of the beams is arranged to extend in tension between the support and each one of the sides of the mass and to be substantially free of bending stress to oppose movement of the mass in each of two opposite direction along each of the second and third axes to prevent damage to the beams during dropping of the accelerometer.

7. An accelerometer according to claim 5 wherein the beams each have tapered sections between the mass and support to enhance movement of the mass in response to acceleration force along the first axis to provide the selected sensitivity of response.

8. An accelerometer according to claim 5 wherein the piezoresistive sensors are responsive to strain in the materials of the beams disposed at two opposite sides of the mass.

9. An accelerometer according to claim 5 wherein each beam has two tapered beam sections having relatively wider parts adjacent respective ends of the beams and relatively narrower parts adjacent the center of the beam, the taper of each section being selected to provide substantially uniform strain in each tapered beam section in providing the selected sensitivity of response to movement of the mass along the first axis, the piezoresistive sensors comprise a piezoresistive sensor accommodated in each tapered section of each of the beams disposed at two opposite sides of the mass, the sensors being interconnected to respond to the strain in the tapered beam sections to compensate for any movement of the mass along the second and third axes to provide an output signal corresponding to movement of the mass along the first axis.

* * * * *